(12) United States Patent
Matsuura et al.

(10) Patent No.: US 10,574,135 B2
(45) Date of Patent: Feb. 25, 2020

(54) ZERO CURRENT DETECTION CIRCUIT FOR BRIDGELESS TOTEM POLE POWER FACTOR CORRECTION CONVERTER AND BRIDGELESS TOTEM POLE POWER FACTOR CORRECTION CONVERTER

(71) Applicant: TDK CORPORATION, Tokyo (JP)

(72) Inventors: Ken Matsuura, Tokyo (JP); Min Lin, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/366,376

(22) Filed: Mar. 27, 2019

(65) Prior Publication Data

US 2019/0305671 A1 Oct. 3, 2019

(30) Foreign Application Priority Data

Mar. 28, 2018 (JP) .................. 2018-061551

(51) Int. Cl.
| | |
|---|---|
| *G05F 1/70* | (2006.01) |
| *H02M 1/42* | (2007.01) |
| *H02M 1/08* | (2006.01) |
| *H02M 7/217* | (2006.01) |
| *H02M 1/00* | (2006.01) |

(52) U.S. Cl.
CPC ......... *H02M 1/4208* (2013.01); *H02M 1/083* (2013.01); *H02M 7/217* (2013.01); *H02M 2001/0009* (2013.01)

(58) Field of Classification Search
CPC ........ H02M 3/1584; H02M 1/08; H02M 1/15; H02M 3/1588; H02M 1/4225; Y02B 70/126

USPC ....... 323/207, 210, 222, 224, 235, 282–285, 323/299; 363/79, 80, 84.126
See application file for complete search history.

(56) References Cited

U.S. PATENT DOCUMENTS

| | | | |
|---|---|---|---|
| 9,350,237 B2 * | 5/2016 | Wang | ................... H03K 17/284 |
| 9,899,909 B2 | 2/2018 | Lin et al. | |
| 10,256,717 B2 * | 4/2019 | Ye | ....................... H02M 1/4225 |
| 2008/0252268 A1 * | 10/2008 | Feldtkeller | ................ G05F 1/70 |
| | | | 323/207 |

(Continued)

FOREIGN PATENT DOCUMENTS

JP 6231673 10/2017

*Primary Examiner* — Rajnikant B Patel
(74) *Attorney, Agent, or Firm* — Greenblum & Bernstein, P.L.C.

(57) ABSTRACT

A zero current detection circuit includes: one detection winding that is magnetically coupled to a boost inductor of a bridgeless totem pole PFC for converting an AC input voltage to a DC output voltage, has one end connected to ground, and generates a zero current detection signal, which changes in proportion to a boost inductor voltage, at another end; a resistor with one end connected to the other end of the detection winding; a clamp composed of two diodes connected to each other in series with a same forward direction, which clamps the inputted zero current detection signal to the ground potential and a positive power supply voltage to convert to a rectangular signal; and a pulse outputter with a comparator which compares the rectangular signal and a comparison voltage and outputs detection pulses with falling edges that are synchronized with an inductor current reaching zero.

6 Claims, 2 Drawing Sheets

(56) References Cited

U.S. PATENT DOCUMENTS

2010/0110593 A1\* 5/2010 Kim ................. H02M 1/32
  361/18
2013/0249504 A1\* 9/2013 Hsu ................ H02M 1/4225
  323/207

\* cited by examiner

ZERO CURRENT DETECTION CIRCUIT FOR BRIDGELESS TOTEM POLE POWER FACTOR CORRECTION CONVERTER AND BRIDGELESS TOTEM POLE POWER FACTOR CORRECTION CONVERTER

FIELD OF THE INVENTION

The present invention relates to a zero current detection circuit for a bridgeless totem pole Power Factor Correction converter that does not include a diode bridge circuit for rectifying an inputted alternating voltage, and also to a bridgeless totem pole Power Factor Correction converter.

DESCRIPTION OF THE RELATED ART

As examples of a zero current detection circuit for a bridgeless totem pole Power Factor Correction converter (hereinafter simply referred to as a "PFC"), a number of zero current detection circuits disclosed in Patent Literature 1 (Japanese Patent No. 6,231,673) are known. These zero current detection circuits each include an inductor auxiliary winding (or "detection winding") that is magnetically coupled to a PFC inductor (or "boost inductor"), a clamping diode circuit that is connected via a resistor to the two ends of the inductor auxiliary winding, clamps each of two voltage signals generated across the two ends with a lower limit value of zero volts and an upper limit value of plus several volts (as one example, a power supply voltage of around 3.3V), and outputs two detection signals with different polarities, and a signal processing module that is composed of a comparator and a logic circuit and outputs a voltage signal (or "zero current detection signal") based on the two detection signals. These zero current detection circuits are categorized into circuits that have two inductor auxiliary windings and circuits that have a single inductor auxiliary winding. From a cost perspective, configurations with a single inductor auxiliary winding are preferable.

SUMMARY OF THE INVENTION

However, the zero current detection circuit for a conventional bridgeless totem pole PFC described above that has one inductor auxiliary winding has the following problem. Since this zero current detection circuit is configured with resistors connected in series to each end of the inductor auxiliary winding, each end of the inductor auxiliary winding is connected to the reference potential (that is, ground potential) of the zero current detection circuit in a high impedance state, resulting in the problem of a tendency for large noise to be applied to the voltage signals generated at each end of the inductor auxiliary winding (or "detection winding").

The present invention was conceived in view of the problem described above and has a principal object of providing a zero current detection circuit for a bridgeless totem pole PFC that is capable of performing zero current detection with low noise using a single detection winding and a bridgeless totem pole PFC equipped with this zero current detection circuit.

SUMMARY OF THE INVENTION

To achieve the stated object, a zero current detection circuit for a bridgeless totem pole Power Factor Correction converter according to the present invention comprises: one detection winding that is magnetically coupled to a boost inductor of the bridgeless totem pole Power Factor Correction converter for converting an alternating current (AC) input voltage to a direct current (DC) output voltage which is outputted, that has one end connected to a reference potential, and that generates a zero current detection signal, which changes in proportion to a voltage across the boost inductor, at another end; a resistor that has one end connected to the other end of the detection winding; a clamp that is connected to another end of the resistor and clamps the zero current detection signal inputted via the resistor to an upper limit voltage that is set in advance and a lower limit voltage that is lower than the upper limit voltage to convert the zero current detection signal to a rectangular signal that is outputted; and a pulse outputter that includes a comparator which compares the rectangular signal with a comparison voltage set between the lower limit voltage and the upper limit voltage and outputs detection pulses with edges, which are one of rising edges and falling edges, that are synchronized with timing at which a current flowing in the boost inductor reaches zero.

Also, a bridgeless totem pole Power Factor Correction converter according to the present invention comprises: the zero current detection circuit for a bridgeless totem pole Power Factor Correction converter described above, the boost inductor; a switching circuit that is constructed of a pair of switches connected in a totem pole and is connected across a pair of output terminals from which the DC output voltage is outputted; two rectifiers that are connected to each other in series with a same forward direction and are connected in parallel to the switching circuit; a current detector that detects an inductor current flowing in the boost inductor and outputs a current detection signal whose voltage value changes in proportion to a current value of the inductor current; a polarity detector that outputs a polarity signal indicating a polarity of the AC input voltage; a target current signal generator that generates, by integrating errors between the DC output voltage and a target voltage for the DC output voltage and multiplying an error integral signal obtained by the integrating and an AC voltage signal indicating the AC input voltage, a sinusoidal target current signal to be traced by an envelope of a peak current value of a triangular inductor current flowing in the boost inductor; and a driving signal generator that operates based on the detection pulses, the current detection signal, the polarity signal, and the target current signal, outputs, when the AC input voltage has positive polarity, a driving signal that switches a low-side switch out of the pair of switches to an on state in synchronization with the edges of the detection pulses and switches the low-side switch to an off state when the current detection signal matches the target current signal, and outputs, when the AC input voltage has negative polarity, a driving signal that switches a high-side switch out of the pair of switches to an on state in synchronization with the edges of the detection pulses and switches the high-side switch to an off state when the current detection signal matches the target current signal.

According to the zero current detection circuit for the bridgeless totem pole Power Factor Correction converter according to the present invention, using a single detection winding that has one end directly connected to the reference potential and is resistant to noise, it is possible to output detection pulses, whose one type of edges are synchronized with the timing at which the current flowing in the boost inductor becomes zero, with little noise. This means that according to the bridgeless totem pole Power Factor Correction converter including the zero current detection circuit, it is possible for the pair of switches connected in a totem pole to operate correctly in current critical mode based on the detection pulses that have little noise.

Also, in the zero current detection circuit for the bridgeless totem pole Power Factor Correction converter according to the present invention, the clamp is composed of two diodes that are connected to each other in series with a same forward direction, a junction between the two diodes is connected to the other end of the resistor, a current input end is connected to the lower limit voltage, and a current output end is connected to the upper limit voltage.

According to the zero current detection circuit, by constructing the clamp of the two diodes that are connected to each other in series with the same forward direction, it is possible to use a simple configuration for the clamp.

Also, in the zero current detection circuit for the bridgeless totem pole Power Factor Correction converter according to the present invention, the pulse outputter includes, as the comparator, at least one of a first comparator that has the rectangular signal inputted at a negative input terminal and has the comparison voltage inputted at a positive input terminal and a second comparator that has the comparison voltage inputted at a negative input terminal and has the rectangular signal inputted at a positive input terminal.

According to the zero current detection circuit comprising the first comparator that has the rectangular signal inputted into the minus input terminal and the comparison voltage inputted into the plus input terminal and the second comparator that has the comparison voltage inputted into the minus input terminal and the rectangular signal inputted into the plus input terminal, during periods where the AC input voltage has positive polarity and periods where the AC input voltage has negative polarity, it is possible to output detection pulses whose edges, which are one of rising edges and falling edges (for example, falling edges), are always synchronized with the timing at which the current flowing in the boost inductor becomes zero. As a result, according to the bridgeless totem pole Power Factor Correction converter that includes the zero current detection circuit, since it is sufficient to always detect one type of edges of the rectangular signal during both periods where the AC input voltage has positive polarity and negative polarity, it is possible to reduce the load at the driving signal generator. Also, according to the zero current detection circuit comprising only one of the first comparator that has the rectangular signal inputted into the plus input terminal and the comparison voltage inputted into the minus input terminal and the second comparator that has the comparison voltage inputted into the plus input terminal and the rectangular signal inputted into the minus input terminal, it is possible to simplify the configuration of the zero current detection circuit.

Also, in the zero current detection circuit for the bridgeless totem pole Power Factor Correction converter according to the present invention, the comparator is constructed of a hysteresis comparator.

According to the zero current detection circuit, by constructing the comparator of the hysteresis comparator, it is possible to further reduce the influence of noise and to output the detection pulses in a state with less noise. This means that according to the bridgeless totem pole Power Factor Correction converter equipped with this zero current detection circuit, it is possible to have the pair of switches connected in a totem pole operate significantly more correctly in current critical mode based on the detection pulses that include less noise.

Also, in the zero current detection circuit for a bridgeless totem pole Power Factor Correction converter according to the present invention, the upper limit voltage is a positive power supply voltage, and the pulse outputter operates only on a single power supply that is the positive power supply voltage.

Also, according to the zero current detection circuit, with a configuration that operates on only the positive power supply voltage that has the reference potential (for example, zero voltage) as a reference (that is, a configuration that operates on a single power supply, compared to a configuration that operates on a dual power supply, that is, a configuration that requires a negative power supply voltage that uses the reference potential as a reference in addition to the positive power supply voltage, it is possible to operate the zero current detection circuit on a simpler power supply configuration.

It should be noted that the disclosure of the present invention relates to the contents of Japanese Patent Application No. 2018-61551 that was filed on Mar. 28, 2018, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a bridgeless totem pole PFC will now be described with reference to the attached drawings.

As one example of a bridgeless totem pole PFC (or hereinafter simply "converter"), the converter 1 depicted in FIGS. 1 and 2 will now be described.

Figure 1:
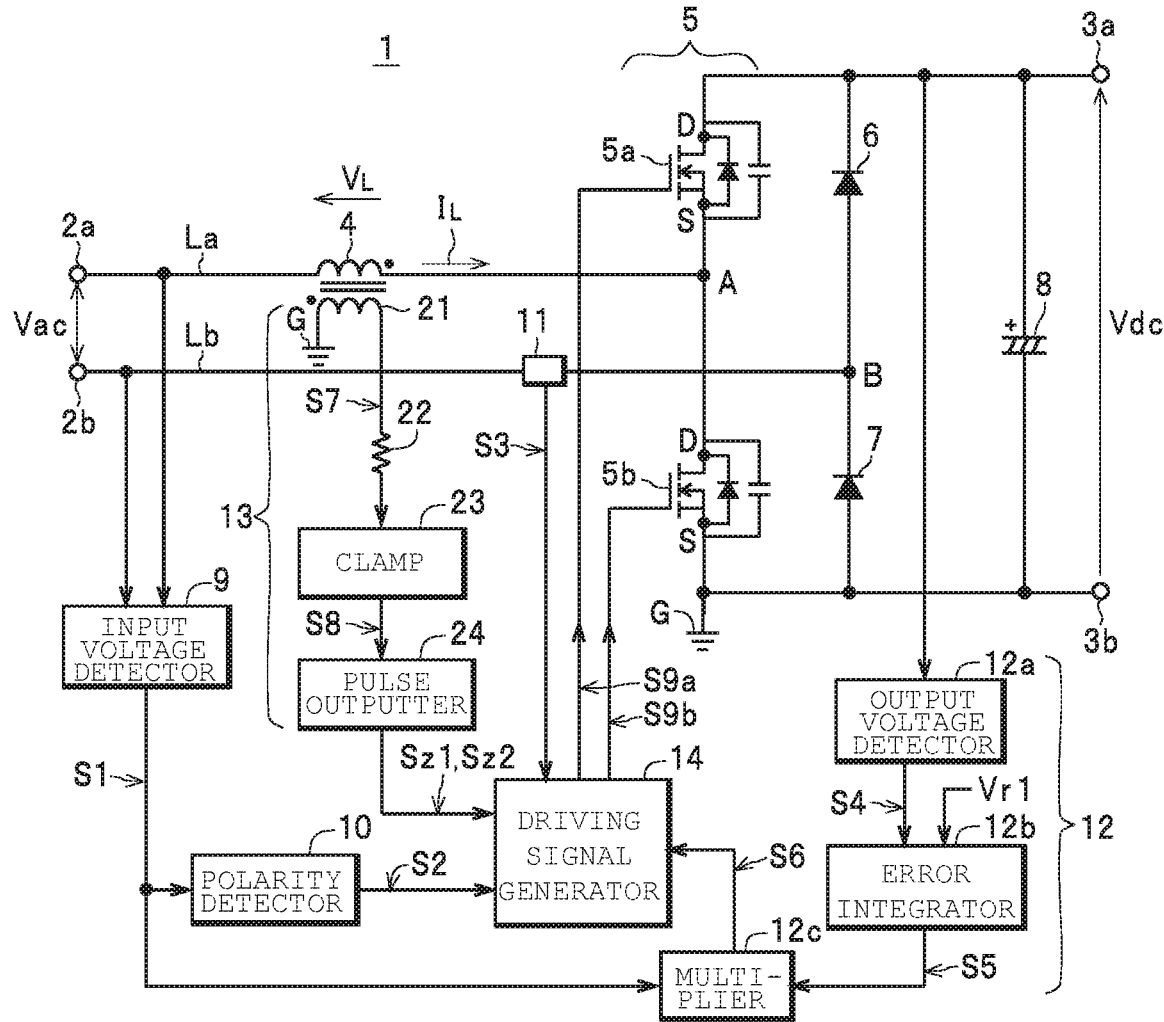
FIG. 1 is a block diagram of a bridgeless totem pole PFC.

As depicted in FIG. 1, the converter 1 includes a pair of input terminals 2a and 2b (hereinafter collectively referred to as the "input terminals 2" when no distinction is made between them), a pair of output terminals 3a and 3b (hereinafter collectively referred to as the "output terminals 3" when no distinction is made between them), a boost inductor 4, a switching circuit 5, two rectifiers 6 and 7, a smoothing capacitor 8, an input voltage detector 9, a polarity detector 10, a current detector 11, a target current signal generator 12, a zero current detection circuit 13 and a driving signal generator 14. The converter 1 configured so as to operate in current critical mode, convert an AC input voltage Vac (an AC voltage such as AC 100V with a frequency, such as 50 Hz or 60 Hz, used for commercial power) inputted across the input terminals 2 to a DC output voltage Vdc (a voltage that exceeds the maximum value of the AC input voltage Vac), and output the DC output voltage Vdc across the output terminals 3. The DC output voltage Vdc is outputted from the output terminals 3a and 3b in a state where one output terminal 3a out of the output terminals 3a and 3b has a positive potential when the potential of the other output terminal 3b is used as a reference (or "reference potential" (as one example to the present embodiment, the ground G potential (or "zero voltage") and where the DC output voltage Vdc is smoothed by the smoothing capacitor 8 connected between the pair of output terminals 3a and 3b. As one example in the present embodiment, an example where the AC input voltage Vac is AC 100V, and the DC output voltage Vdc is DC 400V is described below.

In more detail, as one example, the boost inductor 4 is constructed of a magnetic core and a coil wound around the magnetic core, and is inserted on at least one of a power line La that connects one input terminal (as one example in the present embodiment, the input terminal 2a) out of the pair of input terminals 2 and the switching circuit 5 and a power line Lb that connects the other input terminal (as one example in the present embodiment, the input terminal 2b) out of the pair of input terminals 2 and the two rectifiers 6 and 7. Although a boost inductor 4 is inserted on only the power line La as one example in the present embodiment, the present invention is not limited to this configuration and it is also possible to use a configuration where the boost inductor 4 is inserted on only the power line Lb and a configuration where boost inductors 4 are inserted on both output lines La and Lb.

The switching circuit 5 is constructed of a pair of switches 5a and 5b that are connected in a totem pole and are connected across the pair of output terminals 3. As one example in the present embodiment, the switches 5a and 5b are constructed of n channel MOSFETs (hereinafter simply referred to as "FETs") that incorporate body diodes, the source terminal of the high-side switch 5a and the drain terminal of the low-side switch 5b are connected at a junction A, the drain terminal of the high-side switch 5a is connected to the high potential-side output terminal 3a and the source terminal of the low-side switch 5b is connected to the output terminal 3b that becomes the zero voltage. Note that instead of FETs, the switches 5a and 5b can be constructed of bi-polar transistors.

The switches 5a and 5b are alternately driven to perform an on/off operation (that is, a switching operation) using a driving signal S9a supplied from the driving signal generator 14 to the high-side switch 5a and a driving signal S9b supplied from the driving signal generator 14 to the low-side switch 5b.

By doing so, if the AC input voltage Vac has positive polarity, during an on state of the switch 5b, since energy accumulates in the boost inductor 4, a voltage $V_L$ ("+|Vac|") (note that a voltage in this direction (that is, the direction depicted in FIG. 1) or with this polarity is referred to in the specification as being in the "positive (+) direction") such that the input terminal 2a-side end of the boost inductor 4 becomes a high potential compared to the voltage at the junction A-side end of the boost inductor 4 that becomes the equivalent of ground G potential (the zero voltage) is applied across the boost inductor 4, and an increasing inductor current $I_L$ flows from the input terminal 2a via the switch 5b in the on state toward the input terminal 2b (it is assumed here that a current flowing in this direction (the direction of the arrow in FIG. 1) is in the "positive (+) direction"). On the other hand, when the switch 5b is off, since energy is released from the boost inductor 4, a voltage $V_L$ (−(Vdc−|Vac|) (note that a voltage in this direction or with this polarity is referred to here as being in the "negative (−) direction") such that the input terminal 2a-side end of the boost inductor 4 becomes a low potential compared to the voltage at the junction A-side end of the boost inductor 4 that reaches the equivalent of the DC output potential (Vdc) is generated across the boost inductor 4, and a decreasing inductor current $I_L$ (that is, a current in the positive (+) direction) flows from the input terminal 2a via the switch 5a in the off state (when the switch 5a is an n-channel MOSFET that incorporates a body diode, such body diode) toward the output terminal 3a. The inductor current $I_L$ becomes zero at a time when the discharging of energy from the boost inductor 4 is complete. At such time, since the voltage of the junction A-side end is the voltage Vdc (a charging voltage of the output capacitance of the switch 5b), the voltage $V_L$ across the boost inductor 4 becomes the voltage (−(Vdc−|Vac|)). Immediately after this however, the voltage $V_L$ across the boost inductor 4 suddenly rises in the positive (+) direction due to discharging of the output capacitance of the switch 5b and charging of the output capacitance of the switch 5a. A current that accompanies discharging of the output capacitance of the switch 5b and a current that accompanies charging of the output capacitance of the switch 5a flow in the opposite direction (that is, the negative (−) direction) to the boost inductor 4 as the inductor current $I_L$. Accordingly, when the AC input voltage Vac has positive polarity, the timing at which the inductor current $I_L$ flowing in the boost inductor 4 becomes zero is synchronized with the timing of rises (or "rising edges", that as, "rising edges of a zero current detection signal S7", described later) in the voltage $V_L$ across the boost inductor 4.

Meanwhile, if the AC input voltage Vac has negative polarity, during an on state of the switch 5a, since energy accumulates in the boost inductor 4, a voltage $V_L$ ("−|Vac|") in the negative direction such that the input terminal 2a-side end of the boost inductor 4 becomes a low potential compared to the voltage at the junction A-side end of the boost inductor 4 that becomes the equivalent of the DC output voltage (Vdc) is applied across the boost inductor 4, and an increasing inductor current $I_L$ (a current in the "negative (−) direction") flows from the input terminal 2b via the switch 5a in the on state toward the input terminal 2a. On the other hand, when the switch 5a is off, since energy is released from the boost inductor 4, a voltage $V_L$ (+(Vdc−|Vac|), a voltage in the "positive (+) direction") such that the input terminal 2a-side end of the boost inductor 4 becomes a high potential compared to the voltage at the junction A-side end of the boost inductor 4 that reaches the equivalent of the ground G potential (or "zero voltage") is generated across the boost inductor 4, and a decreasing inductor current $I_L$ (that is, a current in the negative (−) direction) flows from the output terminal 3b via the switch 5b in the off state (when the switch 5b is an n-channel MOSFET that incorporates a body diode, such body diode) toward the input terminal 2a. The inductor current $I_L$ becomes zero at a time when the discharging of energy from the boost inductor 4 is complete. At such time, since the voltage at the junction A-side becomes the equivalent of the ground G potential (the zero voltage), the voltage $V_L$ across the boost inductor 4 becomes (+(Vdc−|Vac|)). Immediately after this however, the voltage $V_L$ across the boost inductor 4 suddenly falls in the negative (−) direction due to the discharging of the output capacitance of the switch 5a and the charging of the output capacitance of the switch 5b. A current that accompanies discharging of the output capacitance of the switch 5a and a current that accompanies charging of the output capacitance of the switch 5b also flow in the opposite direction (the positive (+) direction) as an inductor current $I_L$ to the boost inductor 4. Accordingly, when the AC input voltage Vac has negative polarity, the timing at which the inductor current $I_L$ flowing to the boost inductor 4 reaches zero is synchronized with the timing of falls (or "falling edges", that is, "falling edges of the zero current detection signal S7", described later) of the voltage $V_L$ across the boost inductor 4.

The two rectifiers 6 and 7 are connected to each other in series with the same forward direction and are connected in parallel to the switching circuit 5. As one example in the present embodiment, the rectifiers 6 and 7 are composed of diodes, and by connecting a current output end of the entire rectifier 6 and 7 configuration (that is, the cathode terminal of the diode that constructs the rectifier 6) to the output terminal 3a and connecting the current input end of the entire rectifier 6 and 7 configuration (that is, the anode terminal of the diode that constructs the rectifier 7) to the output terminal 3b, the rectifiers 6 and 7 are connected in parallel to the switching circuit 5. Note that instead of diodes, it is also possible to construct the rectifiers 6 and 7 of FETs (that is, n-channel MOSFETs that incorporate body diodes) that are connected in series with the same configuration as the switching circuit 5 depicted in FIG. 1 and are driven by synchronous rectification. The smoothing capacitor 8 is constructed of an electrolytic capacitor, for example.

As one example, the input voltage detector 9 is constructed of an operational amplifier that operates on positive and negative power supply voltages outputted from positive and negative auxiliary power supplies. The input voltage detector 9 inputs the AC input voltage Vac, amplifies the AC input voltage Vac by an amplification factor set in advance (that is, an amplification factor below 1 so as to lower the voltage to a voltage that can be handled by the following circuits), and converts to and outputs an AC voltage signal S1 that has ground G potential (that is, the zero voltage) as a reference. The AC voltage signal S1 is a sinusoidal signal that is synchronized with the AC input voltage Vac and has the same polarity.

Figure 3:
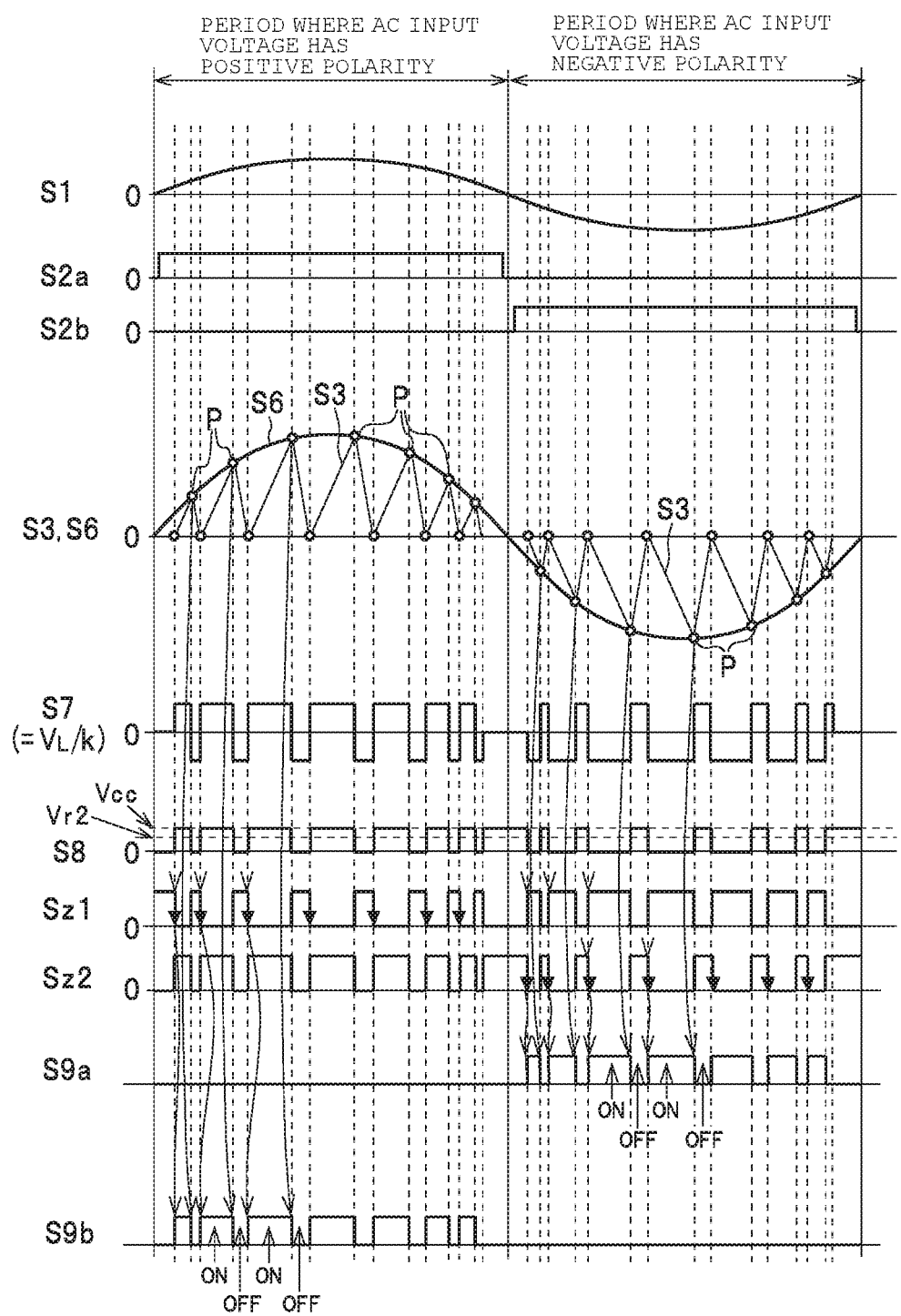
FIG. 3 is a waveform diagram useful in explaining the operations of the zero current detection circuit and the PFC.

As one example, the polarity detector 10 is constructed of a comparator that compares the AC voltage signal S1 and the ground G potential (that is, the zero voltage) and outputs a polarity signal S2 indicating the polarity of the AC voltage signal S1 (as one example, as depicted in FIGS. 1 and 3, a polarity signal S2a indicating that the AC voltage signal S1 has positive polarity and a polarity signal S2b indicating that the AC voltage signal S1 has negative polarity). The current detector 11 is constructed of a Hall element or a current transformer and is disposed on one of the power lines La and Lb. The current detector 11 detects the inductor current $I_L$ flowing at the boost inductor 4 and outputs a current detection signal S3 whose voltage value changes in proportion to the current value of the inductor current $I_L$ and whose polarity changes according to the polarity of the inductor current $I_L$.

As depicted in FIG. 1 for example, the target current signal generator 12 includes an output voltage detector 12a, an error integrator 12b, and a multiplier 12c. The output voltage detector 12a is constructed of a voltage-dividing resistance circuit for example and outputs a voltage detection signal S4 whose voltage value changes in proportion to the voltage value of the DC output voltage Vdc (that is, a signal whose voltage is lowered to a voltage that can be handled by the following circuits and has the ground G potential (the zero voltage) as a reference). As one example, the error integrator 12b is constructed of an integrating circuit that uses an operational amplifier, integrates the difference (error) between the voltage detection signal S4 and a target reference voltage Vr1 indicating a target voltage for the DC output voltage Vdc, and outputs an error integral signal S5. By inputting and multiplying the error integral signal S5 and the AC voltage signal S1, the multiplier 12c generates and outputs a target current signal S6. As depicted in FIG. 3, the target current signal S6 generated in this way is a sinusoidal signal to be traced by the envelope of a peak current value P of the current detection signal S3 that indicates the triangular inductor current $I_L$ flowing in the boost inductor 4.

Note that although the above description uses a target current signal generator 12 configuration where operations are performed on the positive AC voltage signal S1, target current signal S6, and current detection signal S3 during a period where the AC input voltage Vac has positive polarity relative to the ground C potential (the zero voltage) and operations are performed on the negative AC voltage signal S1, target current signal S6, and current detection signal S3 during a period where the AC input voltage Vac has negative polarity, in place of this configuration, it is also possible to use a configuration that superimposes a positive offset voltage on the AC voltage signal S1, the target current signal S6, and the current detection signal S3 across their entire periods (that is, a configuration that converts the respective signals into DC signals). It is also possible to use a configuration where the signs of the AC voltage signal S1, the target current signal S6, and the current detection signal S3 are all left unchanged during a period where the AC input voltage Vac has positive polarity and the signs of the AC voltage signal S1, the target current signal S6, and the current detection signal S3 are all inverted (that is, the signals are converted to positive polarity signals) during a period where the AC input voltage Vac has negative polarity. By using such configurations, it is possible to produce a configuration where all of the control circuits including the zero current detection circuit 13 operate on only a positive power supply voltage that has a reference potential (for example, the zero voltage) as a reference (that is, a configuration that operates on a single power supply). That is, it is possible to simplify the power supply configuration.

Figure 2:
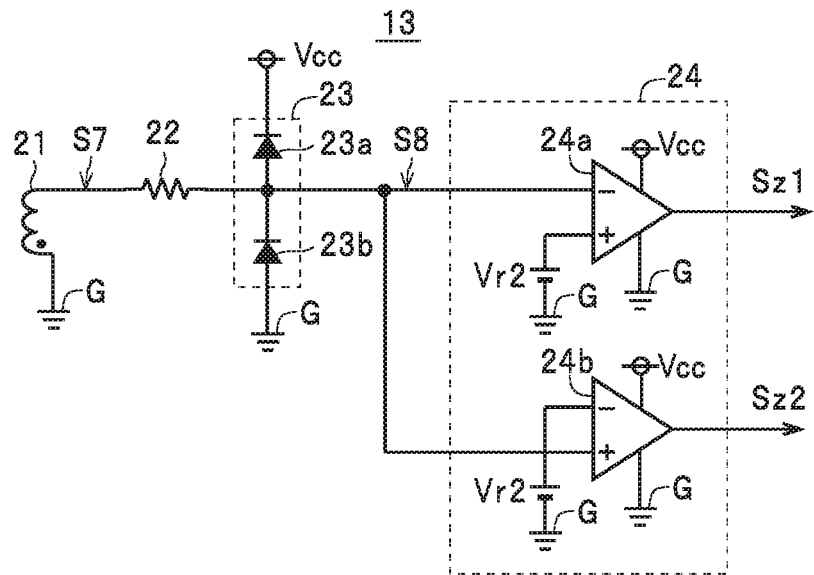
FIG. 2 is a circuit diagram of a zero current detection circuit appearing in FIG. 1.

As depicted in FIGS. 1 and 2, the zero current detection circuit 13 includes one detection winding 21, a resistor 22, a clamp 23, and a pulse outputter 24. The detection winding 21 is magnetically coupled to the boost inductor 4, has one end directly connected to the ground G potential (zero voltage) as a reference potential, and generates a zero current detection signal S7 whose voltage value changes in proportion to the voltage value of the voltage $V_L$ across both ends of the boost inductor 4 at the other end. As one example in the present embodiment, the detection winding 21 is wound together with the winding that constructs the boost inductor 4 around the magnetic core of the boost inductor 4, and is assumed to have a number of turns set at 1/k times the number of turns of the winding that constructs the boost inductor 4 (where k is a number that exceeds 1 but is not limited to an integer, for example 10). The resistor 22 has one end connected to the other end of the detection winding 21.

The clamp 23 clamps the zero current detection signal S7 inputted via the resistor 22 using two clamp voltages (that is, the reference potential and a positive constant voltage) to convert the zero current detection signal S7 to a rectangular signal S8 which is outputted. More specifically, as depicted in FIG. 2, the clamp 23 is constructed of two diodes 23a and 23b that are connected to each other in series with the same forward direction. A junction between the two diodes 23a and 23b is connected to the other end of the resistor 22. A current input end of the entire diode 23a and 23b configuration (in the present embodiment, the anode terminal of the diode 23b) is connected to the ground G potential (a zero voltage as the lower limit voltage) as a reference potential and a current output end of the entire configuration (in the present embodiment the cathode terminal of the diode 23a) is connected to the positive constant voltage (as one example in the present embodiment, the positive power supply voltage Vcc that is outputted from a positive auxiliary power supply as an upper limit voltage, a constant voltage of around 3V to 5V). By using this configuration, when, for ease of understanding, the forward voltage of the diodes 23*a* and 23*b* is assumed to be negligible (that is, zero volts), the clamp 23 outputs the rectangular signal S8 with the minimum voltage of the zero current detection signal S7 clamped to a zero voltage (that is, zero volts) as one clamping voltage and the maximum voltage clamped to the positive power supply voltage Vcc as the other clamping voltage.

The pulse outputter 24 includes a comparator that compares the rectangular signal S8 with a comparison voltage Vr2 that is set between the zero voltage as a reference potential and the positive constant voltage (the two clamping voltages described above at the clamp 23 (the upper limit voltage and the lower limit voltage)) and outputs detection pulses whose edges, which are one of rising edges and falling edges, are synchronized with the timing at which the inductor current $I_L$ flowing in the boost inductor 4 becomes zero. As one example in the present embodiment, as depicted in FIG. 2, the pulse outputter 24 includes two comparators, that is, a first comparator 24*a* and a second comparator 24*b* that operate on a positive power supply voltage Vcc which has the ground G potential (the zero voltage) as a reference (that is, the comparators operate on a single power supply provided by a positive auxiliary power supply). The comparison voltage Vr2 is inputted into the plus input terminal of the first comparator 24*a* and the rectangular signal S8 is inputted into the minus input terminal. The rectangular signal S8 is inputted into the plus input terminal of the second comparator 24*b* and the comparison voltage Vr2 is inputted into the minus input terminal.

With this configuration, due to the first comparator 24*a* comparing the rectangular signal S8 with the comparison voltage Vr2, the pulse outputter 24 outputs detection pulses (or "first detection pulses Sz1") that become a high level (the positive power supply voltage Vcc) when the rectangular signal S8 is below the comparison voltage Vr2 and become a low level (zero volts) when the rectangular signal S8 is above the comparison voltage Vr2. Since the first detection pulses Sz1 are a pulse signal with inverse phase to the rectangular signal S8 and also the zero current detection signal S7 and the voltage $V_L$ (that is, the first detection pulses Sz1 is a signal whose rising edges effectively match falling edges in the other signals and whose falling edges effectively match the rising edges in the other signals), the falling edges of the first detection pulses Sz1 are synchronized with the timing of rises in the voltage $V_L$ when the AC input voltage Vac has positive polarity, which is to say, the timing where the inductor current $I_L$ flowing in the boost inductor 4 becomes zero.

Similarly, the second comparator 24*b* compares the rectangular signal S8 with the comparison voltage Vr2 and outputs detection pulses (or "second detection pulses Sz2") that become a low level when the rectangular signal S8 is below the comparison voltage Vr2 and become a high level when the rectangular signal S8 is above the comparison voltage Vr2. Since the second detection pulses Sz2 are a pulse signal with the same phase as the rectangular signal S8 and also the zero current detection signal S7 and the voltage $V_L$ (that is, the rising edges of these signals effectively match and the falling edges of these signals effectively match), the falling edges of the second detection pulses Sz2 are synchronized with the timing of falls in the voltage $V_L$ when the AC input voltage Vac has negative polarity, which is to say, the timing where the inductor current $I_L$ flowing in the boost inductor 4 becomes zero.

As examples, the driving signal generator 14 is constructed of a DSP, a CPU, or the like and based on the first detection pulses Sz1, the second detection pulses Sz2, the current detection signal S3, the polarity signal S2 and the target current signal S6, generates and outputs a driving signal S9*a* for on/off driving of the switch 5*a* (a signal that is applied across the gate and source of the FET that constructs the switch 5*a*) and a driving signal S9*b* for on/off driving of the switch 5*b* (a signal that is applied across the gate and source of the PET that constructs the switch 5*b*).

The driving signal generator 14 determines the polarity of the AC input voltage Vac based on the polarity signal S2 and generates and outputs the driving signal S9*b* when the AC input voltage Vac has positive polarity (that is, when the polarity signal S2*a* is being outputted) by repeating an operation of switching from the low level to the high level in synchronization with a falling edge or the first detection pulses Sz1 and then switching from the high level to the low level when the level of the current detection signal S3 has reached the target current signal S6 (that is, when the current value of the inductor current $I_L$ indicated by the current detection signal S3 has reached the target current value indicated by the target current signal S6). The driving signal generator 14 also generates and outputs the driving signal S9*a* when the AC input voltage Vac has positive polarity by repeating an operation of switching the driving signal S9*a* to the low level when the driving signal S9*b* is at the high level and switching the driving signal S9*a* to the high level when the driving signal S9*b* is at the low level, with dead time being provided relative to the driving signal S9*b*.

In the same way, the driving signal generator 14 generates and the driving signal S9*a* when the AC input voltage Vac has negative polarity (that is, when the polarity signal S2*b* is being outputted) by repeating an operation of switching from the low level to the high level in synchronization with a falling edge of the second detection pulses Sz2 and then switching from the high level to the low level when the level of the current detection signal S3 has reached the target current signal S6 that is, when the current value of the inductor current $I_L$ indicated by the current detection signal S3 has reached the target current value indicated by the target current signal S6). The driving signal generator 14 also generates and outputs the driving signal S9*b* when the AC input voltage Vac has negative polarity by repeating an operation of switching the driving signal S9*b* to the low level when the driving signal S9*a* is at the high level and switching the driving signal S9*b* to the high level when the driving signal S9*a* is at the low level, with dead time being provided relative to the driving signal S9*a*.

Next, the operation of the converter 1 as a whole that includes the zero current detection circuit 13 will be described with reference to the attached drawings.

In the converter 1, as described above, the input voltage detector 9 inputs the AC input voltage Vac inputted across the pair of input terminals 2 and, as depicted in FIG. 3, converts the AC input voltage Vac to the AC voltage signal S1 that has the ground G potential (that is, zero voltage) as a reference, and outputs the AC voltage signal S1. Also, as depicted in FIG. 3, based on the AC voltage signal S1, the polarity detector 10 outputs the polarity signals S2*a* and S2*b* indicating the polarity of the AC voltage signal S1 (that is, the polarity of the AC input voltage Vac).

Due to the switches 5*a* and 5*b* performing on/off operations based on the driving signals S9*a* and S9*b* outputted from the driving signal generator 14 (that is, by operating in current critical mode), the AC input voltage Vac inputted across the input terminals 2 is converted to the DC output voltage Vdc and outputted across the output terminals 3.

The current detector 11 outputs the current detection signal S3 whose voltage value changes in proportion to the current value of the inductor current $I_L$ flowing in the boost inductor 4 and whose polarity changes in accordance with the polarity of the inductor current $I_L$. As described above, based on the DC output voltage Vdc, the target reference voltage Vr1, and the AC voltage signal S1, as depicted in FIG. 3, the target current signal generator 12 generates and outputs the sinusoidal target current signal S6 to be traced by the peak current value P of the current detection signal S3 indicating the triangular inductor current $I_L$ flowing in the boost inductor 4.

The zero current detection circuit 13 also generates and outputs the first detection pulses Sz1 and the second detection pulses Sz2 based on a voltage (in more detail, the zero current detection signal S7 outputted from the detection winding 21) that is proportional to the voltage $V_L$ across the boost inductor 4 that has been detected by the detection winding 21. Here, as described later, the zero current detection circuit 13 outputs the first detection pulses Sz1 as a pulse signal whose falling edges are synchronized with the timing at which the inductor current $I_L$ becomes zero during a period where the AC input voltage Vac has positive polarity and outputs the second detection pulses Sz2 as a pulse signal whose falling edges are synchronized with the timing at which the inductor current $I_L$ becomes zero during a period where the AC input voltage Vac has negative polarity.

To cause the switches 5a and 5b to operate in the current critical mode, the driving signal generator 14 determines the polarity of the AC input voltage Vac based on the polarity signals S2a and S2b and, as depicted in FIG. 3, switches, when the AC input voltage Vac has positive polarity, the driving signal S9b corresponding to the low-side switch 5b to the high level based on the first detection pulses Sz1 in synchronization with falling edges of the first detection pulses Sz1 (that is, in synchronization with the timing where the inductor current $I_L$ becomes zero) to switch the switch 5b to the on state. After this, the driving signal generator 14 detects whether the current detection signal S3 indicating the increasing inductor current $I_L$ has reached the target current signal S6 and switches, when the current detection signal S3 has reached the target current signal S6, the driving signal S9b to the low level to switch the switch 5b to the off state. Due to this, the inductor current $I_L$ falls and the current detection signal S3 that indicates the inductor current $I_L$ also falls. When the AC input voltage Vac has positive polarity, the driving signal generator 14 keeps the driving signal S9a corresponding to the high-side switch 5a at the low level to keep the switch 5a in the off state.

When the AC input voltage Vac has positive polarity, the driving signal generator 14 operates as described above to generate the driving signals S9a and S9b and due to the on/off driving of the switch 5b in a state where the switch 5a is kept in the off state, as depicted in FIG. 3, the current detection signal S3 continuously changes between the zero voltage and the target current signal S6 with a triangular waveform (that is, the inductor current $I_L$ continuously changes between zero amperes and the target current value with a triangular waveform). That is, when the AC input voltage Vac has positive polarity, the switch 5b operates in current critical mode.

Likewise, as depicted in FIG. 3, when the AC input voltage Vac has negative polarity, the driving signal generator 14 switches the driving signal S9a corresponding to the high-side switch 5a to the high level based on the second detection pulses Sz2 in synchronization with failing edges of the second detection pulses Sz2 (that is, in synchronization with the timing where the inductor current $I_L$ becomes zero) to switch the switch 5a to the on state. After this the driving signal generator 14 detects whether the current detection signal S3, which indicates the inductor current $I_L$ that increases in the opposite direction to when the AC input voltage Vac has positive polarity, has reached the target current signal S6 and switches, when the current detection signal S3 has reached the target current signal S6, the driving signal S9a to the low level to switch the switch 5a to the off state. Due to this, the inductor current $I_L$ falls and the current detection signal S3 indicating the inductor current $I_L$ also falls. When the AC input voltage Vac has negative polarity, the driving signal generator 14 keeps the driving signal S9b corresponding to the low-side switch 5b at the low level to keep the switch 5b in the off state.

When the AC input voltage Vac has negative polarity, since the driving signal generator 14 operates as described above to generate the driving signals S9a and S9b and performs on/off driving of the switch 5a in a state where the switch 5b is kept in the off state, as depicted in FIG. 3, the current detection signal S3 continuously changes in a triangular waveform between the zero voltage and the target current signal S6 (that is, the inductor current $I_L$ continuously changes in a triangular waveform between zero amperes and the target current value. That is, when the AC input voltage Vac has negative polarity, the switch 5a operates in current critical mode.

In this way, in the converter 1, based on the voltage $V_L$ across the boost inductor 4 detected by the detection winding 21, the zero current detection circuit 13 executes an operation where the first detection pulses Sz1 whose falling edges are synchronized with the timing where the inductor current $I_L$ becomes zero are outputted during a period where the AC input voltage Vac has positive polarity and where the second detection pulses Sz2 whose falling edges are synchronized with the timing where the inductor current $I_L$ becomes zero are outputted during a period where the AC input voltage Vac has negative polarity. The operation of the zero current detection circuit 13 will now be described in detail.

As described above, when the AC input voltage Vac has positive polarity, the voltage $V_L$ across the boost inductor 4 changes so that the potential of the input terminal 2a-side end becomes the AC input voltage |Vac| higher than the junction A-side end when the switch 5b is on and the potential of the junction A-side end becomes the voltage (Vdc−|Vac|) higher than the input terminal 2a-side end when the switch 5b is off. Meanwhile, when the AC input voltage Vac has negative polarity, the voltage $V_L$ across the boost inductor 4 changes so that the potential of the junction A-side end becomes the AC input voltage Vac higher than the input terminal 2a-side end when the switch 5a is on and the potential of the input terminal 2a-side end becomes the voltage (Vdc−|Vac|) higher than the junction A-side end when the switch 5a is off.

This means that at the other end of the detection winding 21, which is formed with the polarity depicted in FIG. 1 relative to the boost inductor 1, the rectangular zero current detection signal S7 depicted in FIG. 3 is generated such that in a state where the AC input voltage Vac has positive polarity (that is, a period where the switch 5a is off), the voltage is |Vac|/k (that is, a voltage in the positive (+) direction with the zero voltage (ground G potential: reference potential) as a reference) when the switch 5b is on and the voltage is −(Vdc−|Vac|)/k (that is, a voltage in the negative (−) direction with the zero voltage (ground G potential: reference potential) as a reference) when the switch 5*b* is off, and in a state where the AC input voltage Vac has negative polarity (that is, a period where the switch 5*b* is off), the voltage is −|Vac|/k when the switch 5*a* is on and the voltage is (Vdc−|Vac|)/k when the switch 5*a* is off.

Here, when the AC input voltage Vac has positive polarity, as described above, since the timing at which the inductor current $I_L$ flowing in the boost inductor 4 becomes zero is synchronized with the timing of falls (falling edges) in the voltage $V_L$ across the boost inductor 4 (that is, a voltage that makes the potential of the input terminal 2*a*-side end low compared to the voltage of the junction A-side end as a reference) when the switch 5*b* is off, such timing is also synchronized with the timing at which the zero current detection signal S7 rises from the voltage −(Vdc−|Vac|)/k (that is, a rising edge of the zero current detection signal S7). Similarly, when the AC input voltage Vac has negative polarity, as described above, since the timing at which the inductor current $I_L$ flowing in the boost inductor 4 becomes zero is synchronized with the timing of falls (falling edges) in the voltage $V_L$ across the boost inductor 4 (that is, a voltage that makes the potential of the input terminal 2*a*-side end high compared to the voltage of the junction A-side end as a reference) when the switch 5*a* is off, such timing is also synchronized with the timing at which the zero current detection signal S7 falls from the voltage +(Vdc−|Vac|)/k (that is, a falling edge of the zero current detection signal S7).

The clamp 23 clamps the zero current detection signal S7 to two clamping voltages (the zero voltage and the positive power supply voltage Vcc) and converts to and outputs the rectangular signal S8 whose maximum voltage is the positive power supply voltage Vcc and whose minimum voltage is the zero voltage. Since the rectangular signal S8 is a signal produced by merely converting the voltage level of the zero current detection signal S7, as depicted in FIG. 3, the rectangular signal S8 is a signal whose rising edges are synchronized with the rising edges of the zero current detection signal S7 and whose falling edges are synchronized with the falling edges of the zero current detection signal S7.

At the pulse outputter 24, the first comparator 24*a* compares the rectangular signal S8 and the comparison voltage Vr2 and, as depicted in FIG. 3, outputs the first detection pulses Sz1 (a pulse signal with the opposite phase to the rectangular signal S8) whose falling edges are synchronized with the rising edges of the rectangular signal S8 and whose rising edges are synchronized with the falling edges of the rectangular signal S8. The second comparator 24*b* compares the rectangular signal S8 and the comparison voltage Vr2 and, as depicted in FIG. 3, outputs the second detection pulses Sz2 (a pulse signal with the same phase as the rectangular signal S8) whose rising edges are synchronized with the rising edges of the rectangular signal S8 and whose falling edges are synchronized with the falling edges of the rectangular signal S8.

Here, as described above, when the AC input voltage Vac has positive polarity, since the timing at which the inductor current $I_L$ becomes zero is synchronized with rising edges of the zero current detection signal S7, such timing is therefore synchronized with falling edges of the first detection pulses Sz1 that has the inverse phase to the rectangular signal S8, which is to say, the inverse phase to the zero current detection signal S7. When the AC input voltage Vac has negative polarity, since the timing at which the inductor current $I_L$ becomes zero is synchronized with falling edges of the zero current detection signal S7, such timing is therefore synchronized with falling edges of the second detection pulses Sz2 that have the same phase as the rectangular signal S8, which is to say, the same phase as the zero current detection signal S7.

By doing so, based on the voltage $V_L$ across the boost inductor 4 detected by the detection winding 21, the zero current detection circuit 13 outputs the first detection pulses Sz1 whose falling edges are synchronized with the timing at which the inductor current $I_L$ becomes zero in a period where the AC input voltage Vac has positive polarity and outputs the second detection pulses Sz2 whose falling edges are synchronized with the timing at which the inductor current $I_L$ becomes zero in a period where the AC input voltage Vac has negative polarity.

In this way, the zero current detection circuit 13 for the converter 1 as a bridgeless totem pole PFC includes a single detection winding 21 that is magnetically coupled to the boost inductor 4, has one end directly connected to the zero voltage (reference potential), and generates the zero current detection signal S7 that changes in proportion to the voltage $V_L$ across the boost inductor 4 at the other end, the resistor 22 with one end connected to the other end of the detection winding 21, the clamp 23 that is composed of the two diodes 23*a* and 23*b* that are connected in series to each other with the same forward direction and converts and outputs the zero current detection signal S7 to the rectangular signal S8 described above, and the pulse outputter 21 that includes the comparators 24*a* and 24*b* and outputs the detection pulses Sz1 and Sz2 whose edges, which are one of rising edges and falling edges, are synchronized with the timing at which the inductor current $I_L$ flowing in the boost inductor 4 becomes zero.

Accordingly, according to the zero current detection circuit 13, using a single detection winding 21 that has one end directly connected to the zero voltage and is resistant to noise, it is possible to output detection pulses Sz1 and Sz2, whose one type of edges are synchronized with the timing at which the inductor current $I_L$ becomes zero, with little noise. This means that according to the converter 1 including the zero current detection circuit 13, it is possible for the switches 5*a* and 5*b* to operate correctly current critical mode based on the detection pulses Sz1 and Sz2 that have little noise.

Also, according to the zero current detection circuit 13, by constructing the clamp 23 of the two diodes 23*a* and 23*b* that are connected to each other in series with the same forward direction, it is possible to use a simple configuration for the clamp 23.

The pulse outputter 24 of the zero current detection circuit 13 includes the first comparator 24*a* that has the rectangular signal S8 inputted into the minus input terminal and the comparison voltage Vr2 inputted into the plus input terminal and the second comparator 24*b* that has the comparison voltage Vr2 inputted into the minus input terminal and the rectangular signal S8 inputted into the plus input terminal. This means that according to the zero current detection circuit 13, during periods where the AC input voltage Vac has positive polarity and periods where the AC input voltage Vac has negative polarity, it is possible to output detection pulses Sz1 and Sz2 whose edges, which are one of rising edges and falling edges (in the present embodiment, falling edges), are always synchronized with the timing at which the inductor current $I_L$ becomes zero. As a result, according to the converter 1 that includes the zero current detection circuit 13, since it is sufficient to always detect one type of edges (in the present embodiment, falling edges) of the first detection pulses Sz1 during a period where the AC input voltage Vac has positive polarity and to always detect one type of edges (in the present embodiment, falling edges) of the second detection pulses Sz2 during a period where the AC input voltage Vac has negative polarity, it is possible to reduce the load at the driving signal generator 14.

Note that in place of a configuration that includes the two comparators composed of the first comparator 24a and the second comparator 24b described above, it is also possible to construct the pulse outputter 24 of one out of the first comparator 24a and the second comparator 24b and by doing so, it is possible to simplify the configuration of the zero current detection circuit 13. With a converter 1 including a zero current detection circuit 13 of this configuration, for the detection pulses (one of the detection pulses Sz1 and Sz2) outputted from the zero current detection circuit 13, the edges that are synchronized with the timing at which the inductor current $I_L$ becomes zero during a period where the AC input voltage Vac has positive polarity and the edges that are synchronized with the timing at which the inductor current $I_L$ becomes zero during a period where the AC input voltage Vac has negative polarity differ between falling edges and rising edges. For this reason, the driving signal generator 14 changes the edges to be detected as edges that are synchronized with the timing at which the inductor current $I_L$ becomes zero from the falling edges to the rising edges or from the rising edges to the falling edges in accordance with the polarity of the AC input voltage Vac in order to set a switch in the on state in accordance with present polarity of the AC input voltage Vac.

It is also possible to construct the first comparator 24a and the second comparator 24b described above that construct the pulse outputter 24 of the zero current detection circuit 13 (note that for a configuration that uses only one of the first comparator 24a and the second comparator 24b, this single comparator) of a hysteresis comparator. According to a zero current detection circuit 13 that uses this configuration, it is possible to further reduce the influence of noise and to output the detection pulses Sz1 and Sz2 (when there is one comparator, one of the detection pulses Sz1 and Sz2) in a state with less noise. This means that according to a converter 1 equipped with this zero current detection circuit 13, it is possible to have the switches 5a and 5b operate significantly more correctly in current critical mode based on the detection pulses Sz1 and Sz2 that include less noise.

Also, according to the zero current detection circuit 13, with a configuration that operates on only the positive power supply voltage Vcc that has the zero voltage (the ground G potential: "reference potential") as a reference (that is, a configuration that operates on a single power supply (a positive auxiliary power supply)), compared to a configuration that operates on a dual power supply, that is, a configuration that requires a negative auxiliary power supply that outputs a negative power supply voltage that uses the zero voltage as a reference in addition to the positive auxiliary power supply that outputs the positive power supply voltage Vcc, it is possible to operate the zero current detection circuit 13 on a simpler power supply configuration.

Also, although the example described above uses a configuration that keeps the switch 5a in the off state during a period where the AC input voltage Vac has positive polarity and keeps the switch 5b in the off state during a period where the AC input voltage Vac has negative polarity (that is, a configuration that does not perform synchronous rectification), an place of this configuration, it is also possible to use a configuration where, during the period where the AC input voltage Vac has positive polarity, the switch 5a is switched on in synchronization with the timing at which the switch 5b is switched off and the switch 5a is switched off before the timing at which the inductor current $I_L$ reaches zero, and during the period where the AC input voltage Vac has negative polarity, the switch 5b is switched on in synchronization with the timing at which the switch 5a is switched off and the switch 5b is switched off before the timing at which the inductor current $I_L$ reaches zero (that is, a configuration that performs synchronous rectification).

Moreover, the invention encompasses any possible combination of some or all of the various embodiments and the modification examples described herein and incorporated herein.

It is possible to achieve at least the following configurations from the above-described example embodiments and the modification examples of the disclosure.

(1) A zero current detection circuit for a bridgeless totem pole Power Factor Correction converter, comprising:

one detection winding that is magnetically coupled to a boost inductor of the bridgeless totem pole Power Factor Correction converter for converting an alternating current (AC) input voltage to a direct current (DC) output voltage which is outputted, that has one end connected to a reference potential, and that generates a zero current detection signal, which changes in proportion to a voltage across the boost inductor, at another end;

a resistor that has one end connected to the other end of the detection winding;

a clamp that is connected to another end of the resistor and clamps the zero current detection signal inputted via the resistor to an upper limit voltage that is set in advance and a lower limit voltage that is lower than the upper limit voltage to convert the zero current detection signal to a rectangular signal that is outputted; and a pulse outputter that includes a comparator which compares the rectangular signal with a comparison voltage set between the lower limit voltage and the upper limit voltage and outputs detection pulses with edges, which are one of rising edges and falling edges, that are synchronized with timing at which a current flowing in the boost inductor reaches zero.

(2) The zero current detection circuit for a bridgeless totem pole Power Factor Correction converter according to (1), wherein the clamp is composed of two diodes that are connected to each other in series with a same forward direction, a junction between the two diodes is connected to the other end of the resistor, a current input end is connected to the lower limit voltage, and a current output end is connected to the upper limit voltage.

(3) The zero current detection circuit for a bridgeless totem pole Power Factor Correction converter according to (1) or (2), wherein the pulse outputter includes, as the comparator, at least one of a first comparator that has the rectangular signal inputted at a negative input terminal and has the comparison voltage inputted at a positive input terminal and a second comparator that has the comparison voltage inputted at a negative input terminal and has the rectangular signal inputted at a positive input terminal.

(4) The zero current detection circuit for a bridgeless totem pole Power Factor Correction converter according to any one of (1) to (3), wherein the comparator is constructed of a hysteresis comparator.

(5) The zero current detection circuit for a bridgeless totem pole Power Factor Correction converter according to any one of (1) to (4), wherein the upper limit voltage is a positive power supply voltage, and the pulse outputter operates only on a single power supply that is the positive power supply voltage.

(6) A bridgeless totem pole Power Factor Correction converter, comprising:

the zero current detection circuit for a bridgeless totem pole Power Factor Correction converter according to any one of (1) to (5), the boost inductor;

a switching circuit that is constructed of a pair of switches connected in a totem pole and is connected across a pair of output terminals from which the DC output voltage is outputted;

two rectifiers that are connected to each other in series with a same forward direction and are connected in parallel to the switching circuit;

a current detector that detects an inductor current flowing in the boost inductor and outputs a current detection signal whose voltage value changes in proportion to a current value of the inductor current;

a polarity detector that outputs a polarity signal indicating a polarity of the AC input voltage;

a target current signal generator that generates, by integrating errors between the DC output voltage and a target voltage for the DC output voltage and multiplying an error integral signal obtained by the integrating and an AC voltage signal indicating the AC input voltage, a sinusoidal target current signal to be traced by an envelope of a peak current value of a triangular inductor current flowing in the boost inductor; and a driving signal generator that operates based on the detection pulses, the current detection signal, the polarity signal, and the target current signal, outputs, when the AC input voltage has positive polarity, a driving signal that switches a low-side switch out of the pair of switches to an on state in synchronization with the edges of the detection pulses and switches the low-side switch to an off state when the current detection signal matches the target current signal, and outputs, when the AC input voltage has negative polarity, a driving signal that switches a high-side switch out of the pair of switches to an on state an synchronization with the edges of the detection pulses and switches the high-side switch to an off state when the current detection signal matches the target current signal.

What is claimed is:

1. A zero current detection circuit for a bridgeless totem pole Power Factor Correction converter, comprising:

one detection winding that is magnetically coupled to a boost inductor of the bridgeless totem pole Power Factor Correction converter for converting an alternating current (AC) input voltage to a direct current (DC) output voltage which is outputted, that has one end connected to a reference potential, and that generates a zero current detection signal, which changes in proportion to a voltage across the boost inductor, at another end;

a resistor that has one end connected to the other end of the detection winding;

a clamp that is connected to another end of the resistor and clamps the zero current detection signal inputted via the resistor to an upper limit voltage that is set in advance and a lower limit voltage that is lower than the upper limit voltage to convert the zero current detection signal to a rectangular signal that is outputted; and a pulse outputter that includes a comparator which compares the rectangular signal with a comparison voltage set between the lower limit voltage and the upper limit voltage and outputs detection pulses with edges, which are one of rising edges and falling edges, that are synchronized with timing at which a current flowing in the boost inductor reaches zero.

2. The zero current detection circuit for a bridgeless totem pole Power Factor Correction converter according to claim 1, wherein the clamp is composed of two diodes that are connected to each other in series with a same forward direction, a junction between the two diodes is connected to the other end of the resistor, a current input end is connected to the lower limit voltage, and a current output end is connected to the upper limit voltage.

3. The zero current detection circuit for a bridgeless totem pole Power Factor Correction converter according to claim 1, wherein the pulse outputter includes, as the comparator, at least one of a first comparator that has the rectangular signal inputted at a negative input terminal and has the comparison voltage inputted at a positive input terminal and a second comparator that has the comparison voltage inputted at a negative input terminal and has the rectangular signal inputted at a positive input terminal.

4. The zero current detection circuit for a bridgeless totem pole Power Factor Correction converter according to claim 1, wherein the comparator is constructed of a hysteresis comparator.

5. The zero current detection circuit for a bridgeless totem pole Power Factor Correction converter according to claim 1, wherein the upper limit voltage is a positive power supply voltage, and the pulse outputter operates only on a single power supply that is the positive power supply voltage.

6. A bridgeless totem pole Power Factor Correction converter, comprising:

the zero current detection circuit for a bridgeless totem pole Power Factor Correction converter according to claim 1, the boost inductor;

a switching circuit that is constructed of a pair of switches connected in a totem pole and is connected across a pair of output terminals from which the DC output voltage is outputted;

two rectifiers that are connected to each other in series with a same forward direction and are connected in parallel to the switching circuit;

a current detector that detects an inductor current flowing in the boost inductor and outputs a current detection signal whose voltage value changes in proportion to a current value of the inductor current;

a polarity detector that outputs a polarity signal indicating a polarity of the AC input voltage;

a target current signal generator that generates, by integrating errors between the DC output voltage and a target voltage for the DC output voltage and multiplying an error integral signal obtained by the integrating and an AC voltage signal indicating the AC input voltage, a sinusoidal target current signal to be traced by an envelope of a peak current value of a triangular inductor current flowing in the boost inductor; and a driving signal generator that operates based on the detection pulses, the current detection signal, the polarity signal, and the target current signal, outputs, when the AC input voltage has positive polarity, a driving signal that switches a low-side switch out or the pair of switches to an on state in synchronization with the edges of the detection pulses and switches the low-side switch to an off state when the current detection signal matches the target current signal, and outputs, when the AC input voltage has negative polarity, a driving signal that switches a high-side switch out of the pair of switches to an on state in synchronization with the edges of the detection pulses and switches the high-side switch to an off state when the current detection signal matches the target current signal.

* * * * *